United States Patent [19]

Magerl et al.

[11] 4,201,983

[45] May 6, 1980

[54] ADDRESSING CIRCUITRY FOR A VERTICAL SCAN DOT MATRIX DISPLAY APPARATUS

[75] Inventors: Richard A. Magerl, Schaumburg; George E. Dykas, Vernon Hills; Kenneth W. Hamilton, Rolling Meadows, all of Ill.

[73] Assignee: Motorola, Inc., Schaumburg, Ill.

[21] Appl. No.: 882,691

[22] Filed: Mar. 2, 1978

[51] Int. Cl.[2] .................... G06F 3/14

[52] U.S. Cl. .................... 340/709; 340/724; 340/749

[58] Field of Search ....... 340/324 R, 324 M, 324 AD, 340/340, 709, 724, 748, 749

[56] References Cited

U.S. PATENT DOCUMENTS

| | | | |
|---|---|---|---|
| 3,531,796 | 9/1970 | Kiesling | 340/324 AD |
| 3,568,178 | 3/1971 | Day | 340/748 |
| 3,590,150 | 6/1971 | McMahon | 340/749 |
| 3,859,559 | 1/1975 | Glaser | 340/758 |
| 3,859,560 | 1/1975 | Peters . | |
| 3,859,561 | 1/1975 | Gilbreath et al. . | |
| 3,868,535 | 2/1975 | Kupsky . | |
| 3,903,448 | 9/1975 | Kuchinsky et al. . | |
| 3,967,266 | 6/1976 | Roy | 340/724 |
| 3,976,990 | 8/1976 | Haak | 340/749 |
| 4,024,531 | 5/1977 | Ashby | 340/324 M |
| 4,060,802 | 11/1977 | Matsuki | 340/324 M |
| 4,063,223 | 12/1977 | Schlig et al. | 340/324 M |
| 4,099,097 | 7/1978 | Schermerhorn et al. | 340/779 |

*Primary Examiner*—Marshall M. Curtis
*Attorney, Agent, or Firm*—Sang Ki Lee; James W. Gillman

[57] ABSTRACT

An addressing circuitry for a dot matrix vertical scan plasma display includes a character row counter and a character column counter, a random access memory, a dot pattern generator, a parallel to series shift register, and a driver for the display. The addressing circuitry is responsive to a processor. Alpha-numeric digital characters to be displayed are read out of the memory in sequence in response to a sequence signal from the character row counter and the character column signal output. The words read out of the memory are converted into dot matrix pattern by the dot pattern generator and displayed on the plasma display via the parallel to serial shift register and driver. An offset adder is used when the number of character rows and the number of characters per row of the display are other than binary progression numbers in generating a sequence signal. The offset adder is interposed between the random access memory and the row and column outputs. The offset adder is of a design that eliminates the wasted character memory locations that would otherwise take place in its absence.

The addressing circuitry includes control logic responsive to the processor unit and the random access memory for enabling the dot pattern generator to apply cursor, blinking or blanking control signals selectively to the display.

3 Claims, 7 Drawing Figures

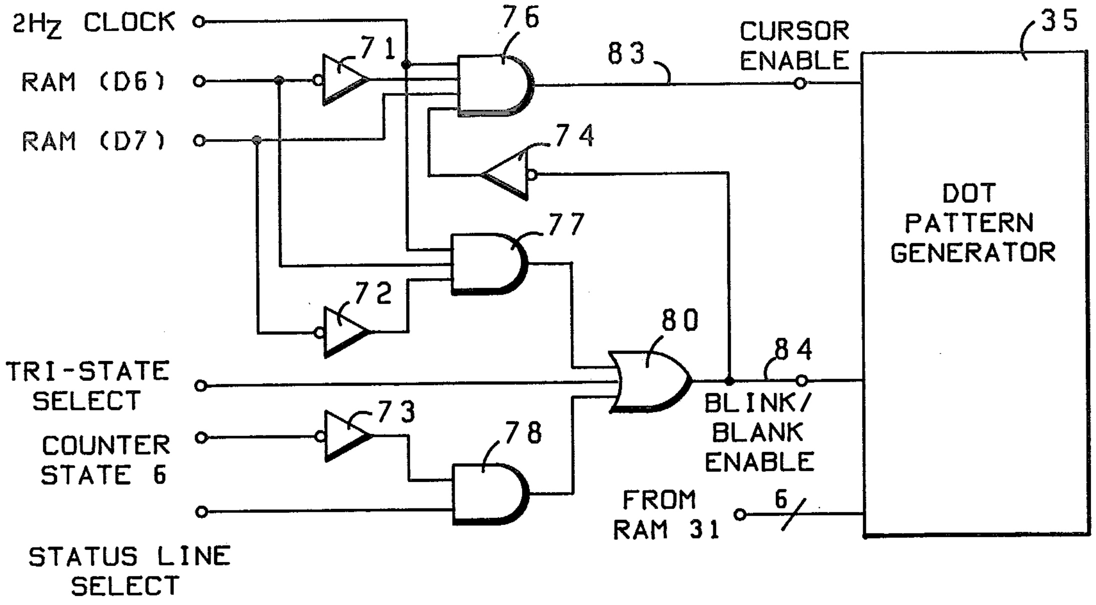
FIG. 6
FIG. 1
PRIOR ART
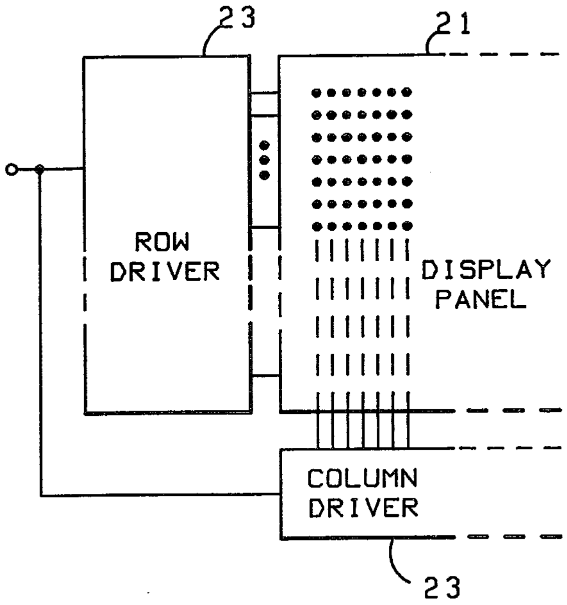
| STATE | STATUS LINE SELECT | TRI-STATE SELECT | RAM D6 | RAM D7 | BLINK/ BLANK ENABLE | CURSOR ENABLE |
|---|---|---|---|---|---|---|
| 1 | 0 | 0 | 0 | 0 | 0 | 0 |
| 2 | 0 | 0 | 1 | 1 | 0 | 0 |
| 3 | 0 | 0 | 0 | 1 | 0 | ⊓⊓ |
| 4 | 0 | 0 | 1 | 0 | ⊓⊓⊓ (BLINKING) | 0 |
| 5 | X | 1 | X | X | 1 (BLANKING) | 0 |
| 6 | 1 | 0 | X | X | 1 (FOR LINES 1-5 BLANK OUT) | 0 |
| | | | | | 0 (FOR LINE 6 DISPLAY ON) | X |
FIG. 7

| ROWS | Q5 (128) | Q4 (64) | Q3 (32) | Q2 (16) | Q1 (8) | DECIMAL VALUE |
|---|---|---|---|---|---|---|
| | CHARACTER ROW COUNTER OUTPUT | | | | | |
| 1 | 0 | 0 | 0 | 0 | 0 | 0 |
| 2 | 0 | 0 | 1 | 0 | 1 | 40 |
| 3 | 0 | 1 | 0 | 1 | 0 | 80 |
| 4 | 0 | 1 | 1 | 1 | 1 | 120 |
| 5 | 1 | 0 | 1 | 0 | 0 | 160 |
| 6 | 1 | 1 | 0 | 0 | 1 | 200 |

| DISPLAY ROW | CHARACTER #'S | | | | |
|---|---|---|---|---|---|
| 1 | 0 | 1 | 2 | • • • | 39 |
| 2 | 40 | 41 | 42 | • • • | 79 |
| 3 | 80 | 81 | 82 | • • • | 119 |
| 4 | 120 | 121 | 122 | • • • | 159 |
| 5 | 160 | 161 | 162 | • • • | 199 |
| 6 | 200 | 201 | 202 | • • • | 239 |

ADDRESSING CIRCUITRY FOR A VERTICAL SCAN DOT MATRIX DISPLAY APPARATUS

BACKGROUND OF THE INVENTION

1. Field of the Invention

This invention relates to an addressing circuitry and more particularly to an improved addressing circuitry for driving dot matrix vertical scan display apparatus, such as a plasma display panel.

Of the number of display apparatus, dot matrix vertical scan plasma display panels have been of a relatively recent introduction. One such manufacture of plasma display panel has been Burroughs Corporation. Burroughs has introduced a number of different models. These displays usually have a number of rows and a number of characters per row to display ASCII characters. In earlier models, number of the rows and characters per row have been based on binary progression numbers; for example, the number of rows of the characters displayed on the panel is one row or two rows or four rows or eight rows which is in the progression of $2^0$, $2^1$, $2^2$, $2^3$ and likewise the number of characters per row is 16 or 32 characters or $2^4$, $2^5$. Each of the characters is represented by illuminating selected ones of seven by seven dot cross points. More recently a new line of models have been introduced wherein the number of rows and the number of characters per row are not binary progression numbers. The new models have been introduced to meet the market needs.

Where the display panels wherein the number of rows and the number of characters per row correspond to a binary progression number, the prior art addressing circuitry provided by manufacturers of the displays have been found satisfactory.

However, the present inventors found that this is not the case with the displays having character rows and having characters per row which are not of binary progression numbers. More specifically, the present inventors found that the prior art addressing circuitry if used to operate such a display, would read out the characters in the random access memory but not in sequence. Instead, they skipped certain character locations in the random access memory in the read out process. This wasted random access memory locations.

The prior art addressing circuitry is also found not to be completely satisfactory in providing cursor, blanking and blinking operation of the display.

SUMMARY OF THE INVENTION

It is an object of the present invention to provide an improved addressing circuitry for a vertical scan dot matrix display apparatus.

It is another object of the present invention to maximize utilization of random access memory capacity.

It is yet another object of the present invention to provide an improved addressing circuitry for improving cursor, blinking and blanking operation of vertical scan dot matrix display.

The foregoing and other objects of the present invention are obtained by an addressing circuitry that includes an offset adder designed to respond to the output of the character row counter and the character column counter of the addressing circuitry and generate a sequence signal for enabling the random access memory of the addressing circuitry to read-out stored memory in a proper sequence in response to a read-out enable signal from the processor without skipping over any characters memory locations that are stored in sequence in the random access memory. This made maximum utilization of random access memory possible for the addressing circuitry used to drive the display having the numbers of rows and characters per row that are other than binary progression numbers.

It is yet another feature of the present invention to provide a control logic responsive to the processor unit and the random access memory for enabling the dot pattern generator to generate signals that permit the display to provide cursor, blinking and blanking operations.

The foregoing and other objects and features of the present invention will become clearer and more readily apprehended from the detailed description of an illustrative embodiment of the present invention hereinbelow in conjunction with the accompanying drawings.

BRIEF DESCRIPTION OF THE DRAWINGS

FIG. 1 shows a schematic drawing of a vertical scan dot matrix plasma display panel and associated drive circuitry.

FIG. 6 shows a logic circuitry advantageously utilized in the present addressing circuitry for providing the cursor, blinking and blanking operation of the display in accordance with the present invention.

FIG. 7 shows a logic state table that helps explain the operation of the logic circuitry and explain the operation of the cursor, blinking and blanking operation in accordance withh the present invention.

DETAILED DESCRIPTION OF THE PREFERRED EMBODIMENT

Figure 2:
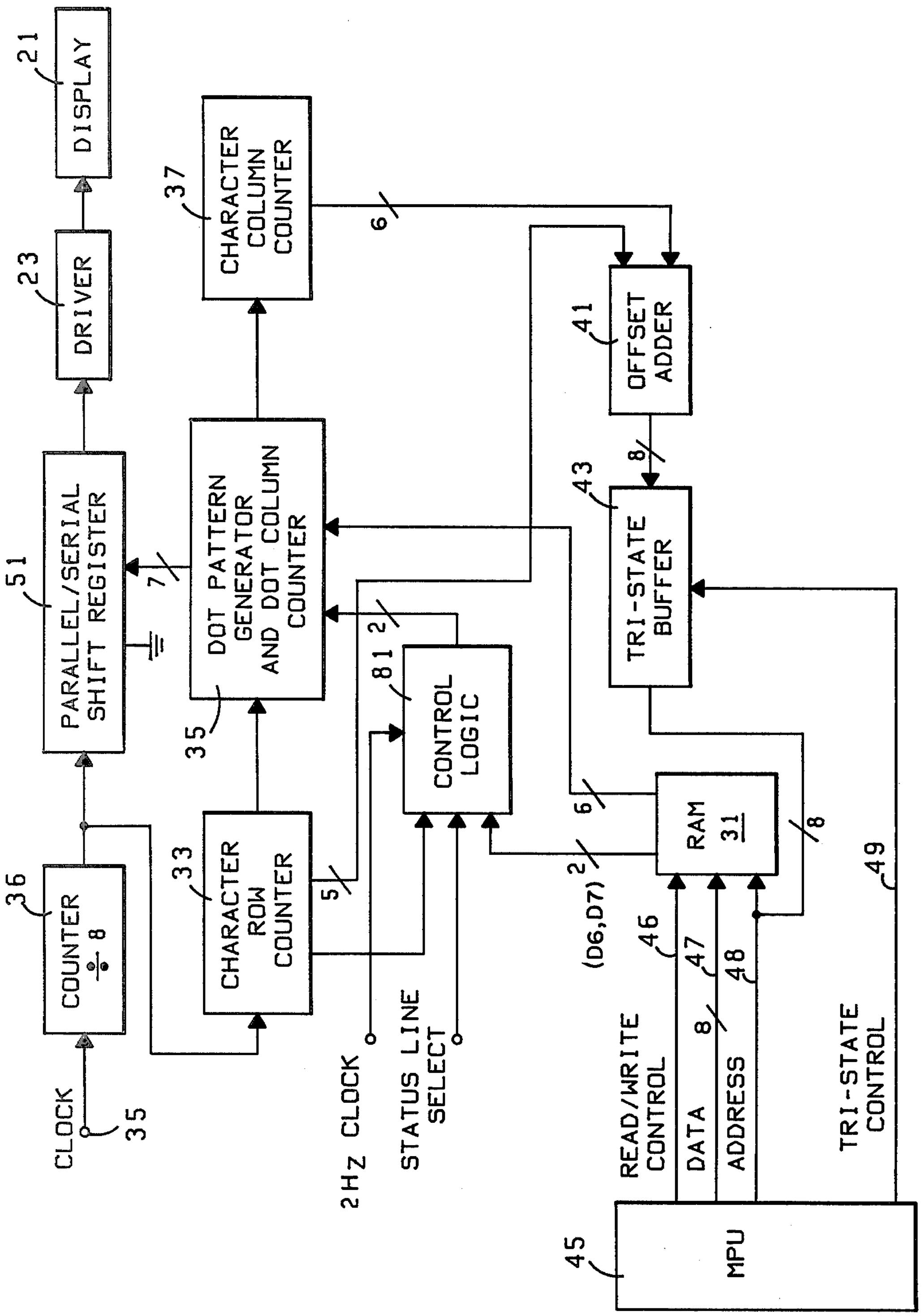
FIG. 2 shows overall functional block diagram of an addressing circuitry according to the present invention.

Generally, referring to FIGS. 1 and 2 the addressing circuitry of the present invention relates to one used to drive a vertical scan dot matrix display panel. As illustrated in FIG. 1 graphically a vertical scan dot matrix display includes plasma display panel, 21 and a row and a column drive circuit 23. The panel is made up of dot matrix cross points arranged in rows and columns as illustrated wherein alpha numeric or other symbols can be represented by a given number of dots in rows and columns, for example, seven by seven dots making up a character. Selected dots may be illumined by application of drive voltage from the column and row drive that applies the necessary amount of potential at selected cross points. By selecting the dot pattern of the cross points of each character, the desired alphanumeric code is formed and illumined. For example, as illustrated in FIG. 1, by illumining the cross points that form the letter M, the display panel provides a visible letter M on its panel.

The row and column drive circuitry and the panel is structured so that the column of dots energized by applying a necessary level of voltage to each of the associated column electrodes and the columns are energized in successive progression. As illustrated in FIG. 1, the column of the electrodes associated with the columns of dots or cross points are energized from left to the right column by column in succession. The row drive energies are applied by the row drive circuitry 23. Here the rows of necessary input DC voltage is supplied in rows to the electrodes in succession. Where both the column and the row drive voltage are applied the cross point is illuminated and rendered visible. This type of display panel is widely known as a plasma display panel and it is characterized as being a vertical scan dot matrix display for which the present addressing circuitry may be utilized. While the display panel for which the present addressing circuitry is largely described in the context of the display panel of the plasma dot matrix display, the application of the present addressing circuitry is, however, not intended to be limited to plasma dot matrix. It will be evident from the following detailed description that while the description of the addressing circuitry of the present invention is in the context of driving the vertical scan dot matrix plasma display panel, it will be clear to one of ordinary skill that the utilization of the present addressing circuitry is not limited nor is intended to be limited to addressing dot matrix plasma display. The present addressing circuitry is readily applicable to other types of displays, if they can utilize the present addressing circuitry. For example, the present addressing circuitry can be readily utilized with minimum amount of modification to drive liquid crystal display if the display drive circuitry is organized to provide a cross point matrix display and if the cross point matrix is energized and illumined in the vertical scan pattern as is the case with dot matrix vertical scan plasma display. For further details of the plasma display and the associated drive circuitry, and understanding of the operation of the display panel and the drive circuitry, one may refer to the applications notes made available by the manufacturers of such displays.

Referring to FIG. 2, there is shown a drive circuitry for addressing the display to read-out data stored in a random access memory 31. Briefly, the addressing circuitry includes a character row counter 33 coupled to a clock 35 via a counter 36. The character row counter output is applied to a dot pattern generator. A character row counter output is also applied to a character column counter 37 via the dot pattern generator and dot column counter 35. The outputs of the character row counter and the character column counter are applied to an offset adder 41 and the output of the offset adder is applied to the random access memory 31 via a tri-state buffer 43. The tri-state buffer is of a conventionally known type that buffers the output of the offset adder or the output of the processor 45 into the random access memory 31.

The processor applies functional control signals such as read/write control signl via path 46, data via path 47 and address via path 48 to the random access memory 31 (hereinafter RAM) in a conventional manner. The microprocessor also applies a tri-state control signal to the tri-state buffer 43 via a tri-state control line 49. This line is activated to apply a sequencing signal from the processor or deactivated to apply the sequencing signal from the counters. The addressing circuitry also includes a parallel to serial shift register 51 which drives a drive circuit 23 in response to the output of the counter 36 and the dot pattern generator 35.

As it is generally known, the random access memory 31 is usually organized in the form of ASCII code format. For example, an eight bit binary word for each character is used to represent alpha numberic characters in ASCII codes.

The dot generator provides the usual conventional function of converting the eight bit ASCII code characters to a train of eight bit binary parallel output pulses. The parallel to serial shift register converts the seven bit parallel output from the dot pattern generator 35 into a serial pulse train applied to the driver circuit 23. The drive circuit in turn actuates or drives the display. In response the display illumines a dot matrix to show alpha-numeric signals.

In operation, briefly stated, the character row counter and the character column counter outputs are utilized to derive a sequence signal which is applied to the RAM. In response to the sequence signal and the address signal from the microprocessor, stored information is read out of the RAM memory. The characters read out of the RAM is then applied to the dot pattern generator which converts the character read out into a seven bit binary output. The binary output is then applied to the display via the shift register and drive circuitry to provide the usual display. Various functional elements of the addressing circuitry and their operation described generally hereinabove have a number of problems and shortcomings.

According to the prior art, the output of the character row counter and the character column counter is not applied to an offset adder 41 as illustrated but is directly applied to the tri-state buffer 43. The prior art circuitry has been found suitable for addressing and displaying a dot matrix display wherein the number of rows of the characters and the number of characters per row are binary progression numbers, such as $2^0, 2^1, 2^2, 2^3, 2^4$ . . . or 1, 2, 4, 8, 16 where this is the case, the output of the character row counter and the character column counter can be directly applied to a tri-state buffer and effectuate the display function without any shortcomings. This is generally known with the currently available dot matrix display and is made possible because of certain association or relationship between the dot matrix structure of the display and the RAM. Thus, for example, suppose the display has four character rows with thirty-two characters per row or a 4×32 cross point character matrix. The ASCII coded byte organized memories of the RAM is set up in sequence and they must be addressed in sequence in proper order so that when they are read out onto the display, they appear in proper order. In the 4×32 cross point character matrix case, the character row counter provides four, two-bit binary outputs and the characters column counter provides 32, five bit binary outputs. The two-bit and five-bit binary outputs are combined into a 7-bit code and applied as a sequencing signal to the RAM 31. In response to the sequencing signal, RAM 31 is read out in proper order so that when the stored characters are read out and displayed onto the dot matrix display, they appear in the order as shown in the table hereinabelow.

| | | | | | |
|---|---|---|---|---|---|
| 0 | 1 | 2 | 3 | . . . | 31 |
| 32 | 33 | . . . | . . . | . . . | 63 |
| 64 | 65 | . . . | . . . | . . . | 95 |
| 96 | 97 | . . . | . . . | . . . | 127 |

Note that the characters read out of the RAM must line up on a column by column basis where, for example, the first column should have the first character and then the 32nd, then 64th and then 96th characters in the first column character read out first. Since the read out is in the column scan orientation, then in the first column, characters in RAM memory locations 0, 32, 64 and 96 must be read out from RAM 31. For the second column, characters in memory locations 1, 33, 65 and 97, should be read out and so on until the 32nd column characters corresponding to locations 31, 63, 95 and 127 be read out. The characters read out in this order are refreshed fast enough so that human eyes can perceive them as a continuous read out. In summary, according to the prior art, this sequencing is obtained by having the row counter provide two-bit binary words and the character column counter provide five-bit binary words and the two and five bit outputs are combined into the seven bit binary words where the two-bit output of the row counters are used as the two most significant bits of the seven-bit words and the seven bit outputs are directly applied to the tri-state buffer and thence to the RAM. The seven-bit binary words applied in this manner to the random access memory 31 causes the read out of the characters in sequence in 0, 1, 2, 3 . . . and so on are displayed on the column scan dot matrix plasma display, in proper order, i.e., 0, 32, 64, 96 in first column, 1, 33, 65, 97 in second column and so on so that the output is presented to the viewer in proper order.

More recently, the plasma display manufacturers have introduced models where the number of rows and number of characters per row do not correspond to any binary progression number. For example, recently Burroughs introduced six rows by 40 characters per row. Neither six nor 40 are numbers that are based on binary progression. For the 6×40 display, the character row counter and character column counter would provide a three bit and a six-bit binary word respectively to represent the number of rows and number of columns involved. Now if the three bits and six bits are combined with the three bit as the most significant bits, then this will result in nine bit binary words being applied to RAM 31, if the prior art approach of providing sequencing signal to the random access memory 31 is utilized, as is explained hereinabove. When this is done, it is found that the read out from RAM does not take place in sequence but a number of ASCII character locations in the random access memory are skipped as is illustrated in the following table.

| TEXT | | | | | UNUSED MEMORY LOCATIONS | | |
|---|---|---|---|---|---|---|---|
| 0 | 1 | | 2 | ..... | 39 | 40 ..... | 63 |
| 64 | | 65 | | ..... | 103 | 104 ..... | 127 |
| 128 | | | | ..... | 167 | 168 ..... | 191 |
| 192 | | | | ..... | 231 | 232 ..... | 255 |
| 256 | | | | ..... | 295 | 296 ..... | 319 |
| 320 | | | | ..... | 359 | 360 ..... | 383 |

As illustrated hereinabove, with the direct application of the prior art, the locations 40–63, 104–127, 168–191, 232–255, 246–319, 360–383 as illustrated in the above table are skipped. Restated this means the ASCII code binary character locations in the RAM that are skipped are not addressed so that they are wasted, or stated in other words RAM, capacity is not fully utilized.

Figures 3, 4, 5:
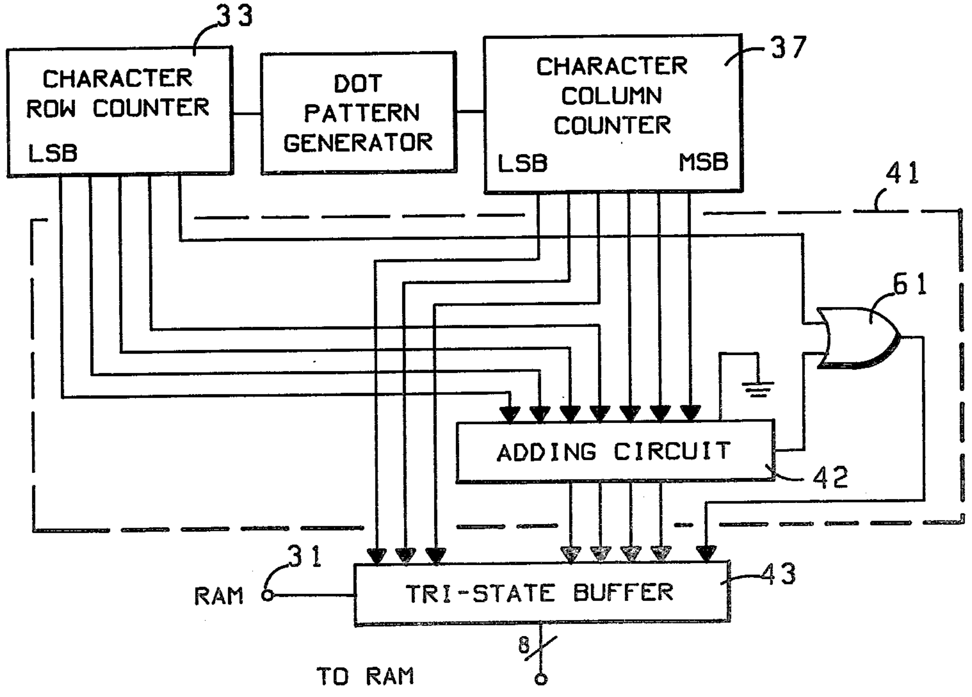
FIG. 3 shows a functional schematic diagram of an offset adder circuitry advantageously utilized in the addressing circuitry according to the present invention.
FIG. 4 shows the binary output from the character row counter output that helps explain the operation of the offset adder shown in FIG. 3.
FIG. 5 shows a representation of the row character numbers of the display panel that helps explain the principle of the present invention in conjunction with the offset adder circuit shown in FIG. 3.

The present inventors have found a way of overcoming the foregoing shortcomings by introducing a row offset adder circuitry 41 that will avoid skipping of the memory locations in the RAM and yet permit read out of the RAM in a proper sequence so that when displayed on the matrix display they will line up in a predetermined order so that the message is properly displayed. This will now be explained with reference to FIGS. 2, 3, 4 and 5. FIG. 3 illustrates in detail the row offset adder circuitry 41. As shown in FIG. 4, the character row counter provides five-bit digital words with the four least significant bits making up four-bit words which are applied to an adding circuit 42 in the row offset adder 41. The character column counter provides a six bit binary word output with the three most significant bits being added to the adding circuit 42. The three least significant bits of the character column counter are added to the tri-state buffer directly. The three most significant bits and the four least significant bits applied to the adding circuit are added in binary form to provide a four bit output as illustrated. The fifth most significant bit from the row counter and a carry output from the row offset adder are OR gated through an OR gate 61 and thence applied to the tri-state buffer.

The three bit outputs from the character column counter, the four bit outputs from said adding circuit and the one output from the OR gate 61 together make up eight bit binary words that are applied to tri-state buffer 43.

The row offset adder 41 and the OR gate 61 and the manner in which they are designed are ultimately to provide binary words to be applied to RAM so that the ASCII memories are read out in proper sequence without skipping any memory locations and that they are on display in the proper order.

The eight bit binary words provided by the row offset adder 41 are designed to provide eight bit binary words as illustrated in FIG. 3. Note that adding circuit 42, the OR gate 61 and the manner in which the outputs of the character row counter and characters column counter are combined to produce the eight bit output are organized so as to provide eight bit binary outputs as illustrated in FIG. 3. Note that the three least significant bits from the character column counter and the five bits from the adding circuit are applied to the RAM and the binary number applied are in the progressing numbers of 0, 1, 2, 3, . . . to 239 for the 6×40 characters. The ASCII stored in RAM is read out and aligned in columns in the order shown in FIG. 5, namely, 0, 40, 80, 120, 160, 200 for the first column 1, 41, 81, 121, 161, 201 for the second column and so on until 39, 79, . . . 239 characters are read out in the 40th column. In the foregoing manner, RAM memory is read out in proper sequence without skipping any memory locations and then properly read out onto the dot matrix display in a proper order.

According to another aspect of the present invention, cursor, blinking and blanking operations are provided on the dot matrix display by use of a control logic interposed between the dot pattern generator and RAM and operative under the command of the microprocessor. Specifically, referring to FIGS. 2 and 6 there is shown a control logic 81 in the addressing circuitry that provides the above stated operational functions. For the input to the control logic, the following signals are applied. A clock signal, the character row counter output, a status line select signal from the microprocessor, two bit output (D6, D7) of the random access memory, and the output of the tri-state buffer. The output of the control logic is applied to the dot pattern generator as indicated. A specific illustrative example of the control logics circuitry is shown in FIG. 6. As noted therein inversion gates 71, 72, 73 and 74, and AND gates 76, 77 and 78 and an OR gate 80 are operatively connected as shown. For the inputs to the control logic, the clock signal, the tri-state select signal, character counter state, status line selected signals are applied as shown and the control logic is of a design that provides a cursor enable signal, and blink/blank enable signals at the output terminals 83 and 84. The cursor and blink/blank enable signals are applied to the dot pattern generator. FIG. 7 shows the states of the various signals applied to the control logic as indicated.

More specifically, as shown when the status line select signal, the tri-state select and the random access memory inputs D6 and D7 are in zero binary states, then as indicated in FIG. 7, there is no blink/blank enable or cursor enable signals applied to dot pattern generator. The designation of D6 and D7 for the random access memory output is intended here to denote the fact that the sixth and seventh significant digital bit output of RAM are applied to the control logic. Note that when the status line select and tri-state select lines remain in logical 0 and the D6 and D7 outputs of RAM changes to logical 1 state in both cases, then the blink/blank enable and cursor enable signals remain in logical state 0 as shown in state row 2. This means that when both the D6 and D7 binary outputs of RAM are either logical 0 or 1 and when the status lines select and tri-state select input remain logical 0, the blink/blank enable, and cursor enable signal are not applied to dot pattern generator and consequently the dot matrix display will not provide the corresponding operations.

Now referring to the row 3 state in FIG. 7, note that the status line select, tri-state select and D6 output of RAM remain in logical 0 and that the D7 output of RAM changes to logical 1. In this instance, it should be noted that control logic shown in FIG. 6 will operate in such a way that NAND gate 76 will provide a train of output pulses which correspond to the clock pulse train applied to the intput thereof because the other three inputs all are now in the logical state 1. The pulse train output in the form of a clock pulse train now appears at the cursor enable output lead 83. This is applied to dot pattern generator and in turn the dot pattern generator provides an output signal to the dot matrix display via the parallel to serial shift register and the drive circuitry and causes the cursor enable operation in a generally known manner. As generally known the cursor operation entails a pointer on the dot matrix display which indicates the next character position that will be read out of the matrix and the character location information of the next character comes from RAM which is simultaneously applied to that pattern generator as the cursor enable signal is applied. The cursor blinks, as generally known, at the 2 Hz clock rate for example.

Now referring back to FIG. 7, as indicated in the state row number 4, when the status line select, tri-state select and the ram outputs are in logical 00, 10 then the blink/blank enable signal output terminal 84 provides an output in the form of a pulse train which is a repetition of the clock pulse train. The cursor enable output terminal will go back to logical 0. With the blinking signal in the form of a pulse train applied to the dot pattern generator, the dot pattern generator, in turn, responds to the blinking signal and the output of RAM and causes the dot matrix display to blink the character selected by the RAM output.

Now referring to the state of the inputs to the control logic as shown in the row number 5, when the tri-state select signal applies to the control a logical 1, then regardless of the states of the status line select and RAM outputs D6 and D7 to the control logic, the blank enable output 84 applies a logical 1 and cursor enable applies logical 0. With the logical 1 signal applied to the dot pattern generator in this manner, the entire display is blanked out in the known manner.

Now referring to logic input states, as shown in the state row 6, when the status line select goes to logical 1, tri-state select to logical 0, then blink/blank enable 84 is controlled by counter state 6. During the scanning of the first five lines, counter state 6 will be a logical 0 and during the scanning of the sixth line, counter state 6 will be a logical 1. Therefore, during the scanning of lines 1 through 5 regardless of the inputs to the control logic from RAM via D6 and D7, the control logic provides a logic 1 on its blink/blank output terminal 84. Under these conditions, regardless of the output of RAM applied to the dot pattern generator, the dot matrix display will blank out a predetermined number of lines and retain the remaining lines that have not been blanked out. For example, as shown in FIG. 7, row number 6, when this condition takes place, the blank output causes the first five rows of the dot matrix display to blank out and the remaining sixth row to remain lit.

Hereinabove an addressing circuitry has been described for addressing and displaying a dot matrix character display that has six rows by 40 characters per row and that includes an offset adder that enables the addressing circuitry to read out RAM memories in sequence without skipping memory locations and display them in predetermined proper order on the display. As described hereinabove, the addressing circuitry also includes a control logic circuitry interposed between dot pattern generator and the random access memory for providing the cursor, blinking and the blanking operations. Various modifications and changes may be made to the present addressing circuitry by those of ordinary skill without departing from principles of the present invention described with reference to an illustrative embodiment hereinabove without departing from the spirit and scope of the present invention as claimed hereinbelow.

What is claimed is:

1. An addressing circuitry for a column-wise scanning dot matrix display having R character rows and Q character columns where either R or Q or both are not equal to 2n wherein R, Q and n are integer numbers, respectively, said addressing circuitry comprising:

a clock source for generating timing signal pulses, a random access memory for storing information in binary character codes wherein said memory has at least X character locations, X being equal to R times Q, and said information in binary character codes are stored in continuum, a character row counter responsive to the timing signal, a character column counter responsive to the timing signal, means for providing addressing signal to said random access memory to read out the binary characters stored therein, said random access memory responsive to the addressing signal for reading out the stored binary characters, a dot pattern generator for converting the binary-coded characters read out of the random access memory into dot matrix pattern characters, and an off-set adder coupled between said character row counter and said character column counter and said random access memory, wherein said row and column counters, and said off-set adder are arranged to provide a unique offset to the addressing signal for enabling said addressing means to address and read out said random access memory so that the information in binary character codes stored in continuum are read out in a proper sequence and displayed in a dot matrix form on said dot matrix display panel in a proper sequence.

2. The addressing circuitry according to claim 8, including a control logic circuitry interposed between the random access memory and the dot pattern generator and responsive to a command signal from said addressing means and the output of the character row counter for enabling said character generator to drive said display to provide selectively cursor, blinking and blanking operations.

3. The addressing circuitry according to claim 2, wherein said control logic circuitry includes a plurality of logic states operatively coupled to provide first and second outputs, first output for providing cursor-enable signal and second output for providing blink-enable and blank-enable signals selectively to said character generator.

* * * * *

UNITED STATES PATENT AND TRADEMARK OFFICE
CERTIFICATE OF CORRECTION

PATENT NO. : 4,201,983

DATED : May 23, 1980

INVENTOR(S) : RICHARD A. MAGERL ET AL

It is certified that error appears in the above-identified patent and that said Letters Patent are hereby corrected as shown below:

Col. 1, line 13, "manufacture" should be --manufacturer--.

Col. 2, line 1, "characters" should be --character--.

Col. 2, line 43, "withh" should be --with--.

Col. 2, line 51, remove "," after panel

Col. 3, line 58, "signl" should be --signal--.

Col. 4, line 4, "numberic" should be --numeric--.

Col. 4, line 21, "is" should be --are--.

Col. 4, lines 61 and 62, "hereinabelow" should be --hereinbelow--.

Col. 5, line 5, "column character" should be --character column--.

Col. 5, line 65, "code" should be --coded--.

Col. 7, line 9, "selected" should be --select--.

Col. 7, line 43, "intput" should be --input--.

Col. 7, line 61, "ram" should be --RAM--.

Claim 2, Col. 10, first line, "claim 8" should be --claim 1--

UNITED STATES PATENT AND TRADEMARK OFFICE
CERTIFICATE OF CORRECTION

PATENT NO. : 4,201,983

DATED : May 23, 1980

INVENTOR(S) : RICHARD A. MAGERL ET AL

It is certified that error appears in the above-identified patent and that said Letters Patent are hereby corrected as shown below:

Claim 3, Col. 10, line 11, "states" should be --gates--.

Signed and Sealed this

*Fifth* Day of *August 1980*

[SEAL]

*Attest:*

SIDNEY A. DIAMOND

*Attesting Officer* *Commissioner of Patents and Trademark*